United States Patent [19]

Tolson

[11] Patent Number: 5,326,938
[45] Date of Patent: Jul. 5, 1994

[54] WEIGHTING/LABELLING APPARATUS INCORPORATING IMPROVED CONVEYOR AND METHOD

[75] Inventor: Sidney S. Tolson, Scotland Neck, N.C.

[73] Assignee: Ossid Corporation, Rocky Mount, N.C.

[21] Appl. No.: 48,893

[22] Filed: Apr. 16, 1993

[51] Int. Cl.5 .................. G01G 23/38; G01G 19/00; B65G 15/14
[52] U.S. Cl. ........................ 177/5; 177/145; 198/626.1
[58] Field of Search .............. 177/4, 5, 145; 198/626.1

[56] References Cited

U.S. PATENT DOCUMENTS

| | | | |
|---|---|---|---|
| 5,086,855 | 2/1992 | Tolson | 177/5 |
| 5,090,557 | 2/1992 | Carmen | 198/626.1 |
| 5,137,099 | 8/1992 | Tolson | 177/5 |

Primary Examiner—George H. Miller, Jr.
Attorney, Agent, or Firm—Olive & Olive

[57] ABSTRACT

An apparatus for the weighing and labelling of products with non-flat bottoms in a high speed processing environment has a first entry section, a second weighing section and a third labelling section. The first and third sections incorporate a horizontal conveyor belt and a pair of vertical control belts. The second weighing section incorporates a unique horizontal belt arrangement which is adapted to change its shape and to deform in response to the weight and shape of the product. Products are fed in the first section, weighed in the second section and labelled in the third section and in practicing the method of the invention utilizing the described apparatus, product wobble and oscillation, particularly in the second weighing section, is minimized and more accurate weighing and labelling is achieved.

24 Claims, 2 Drawing Sheets

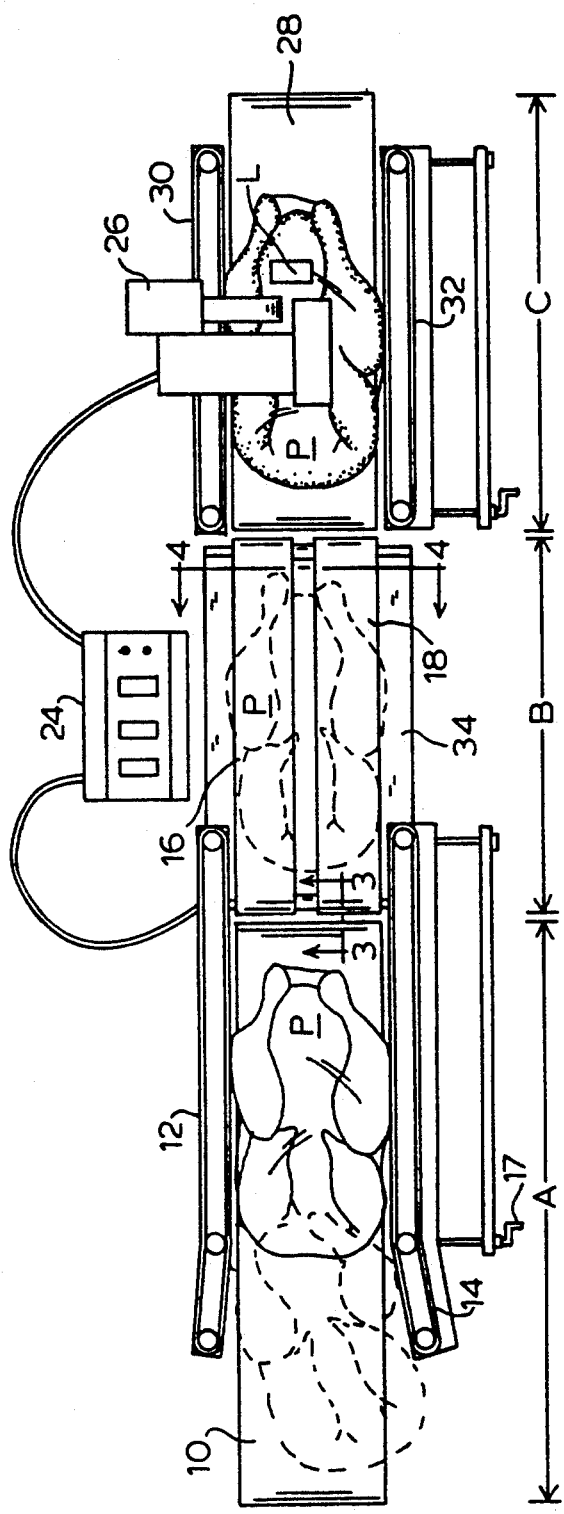
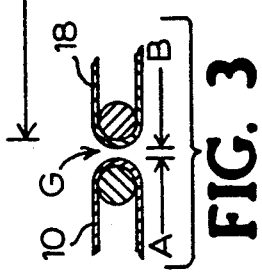
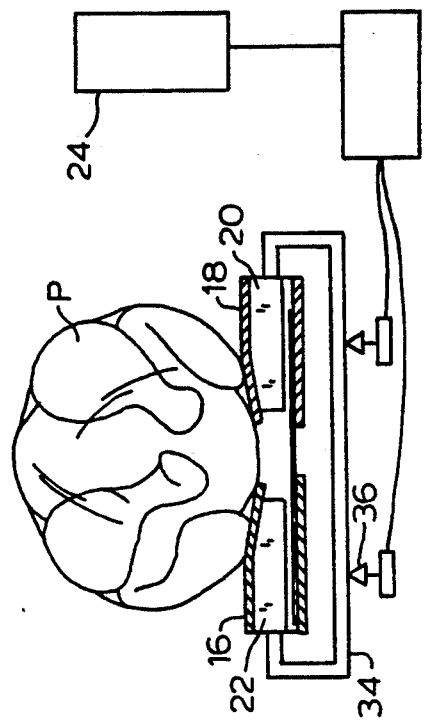
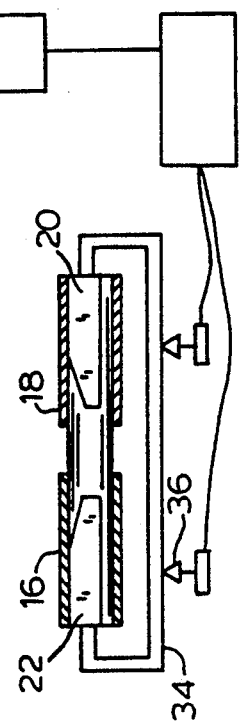
FIG. 2
FIG. 3
FIG. 4
FIG. 5

WEIGHTING/LABELLING APPARATUS INCORPORATING IMPROVED CONVEYOR AND METHOD

FIELD OF THE INVENTION

The invention relates to an apparatus and method for weighing and labelling items, and more particularly for weighing and labelling items which rests on nonflat bottoms, such as whole poultry in bags while such items are transported by conveyor in a high speed weighing and labelling operation.

BACKGROUND OF THE ART

In high speed packaging, weighing and labelling operations, after the step of wrapping a product such as meat or poultry for sale in a supermarket, the next requirement is for that product to be weighed and labeled. If the product happens to be one with a flat bottom or one supported in a tray, it tends to function smoothly in a conveyorized operation. If it is a product that does not have a flat bottom, such as a whole bird poultry product or is another type of product having an irregular surface on which the product typically rests while being conveyed, the swift movement of a conventional flat horizontal conveyor may induce oscillation or wobble in the product while being conveyed. The reason for this is that in modern conveyorized packaging operations, the products can be processed at speeds of 70 or more pieces per minute. That amount of speed will frequently jolt a whole bird poultry product such that it rocks on its non-flat bottom and begins to wobble.

Wobble or oscillation by itself may not present a problem if it is being transported merely to get to a destination, but when the purpose of the transport is to weigh and label the bird, unreliability and inaccuracy will most likely occur. A wobble in the weighing operation will result in an incorrect weight. A wobble in the labelling operation will result in an improperly positioned label. In addition, the wobble on a flat open conveyor belt frequently results in an orientational misalignment of the product, further disturbing label location.

The conventional conveyor is one which has a basically flat horizontal belt, or similar supporting surface, and transports the product through the operative stations. In the case of a multiple process sequence, typically entry, weighing, and labelling, the conveyor system may be a series of short conveyors working in sequence. Such a multiple sequence conveyor apparatus for weighing and labelling is exemplified by the HI 2600 apparatus made by New Brunswick International, Inc. of Lilburn, Ga. Wobble is very likely to occur in this sort of system when the product does not have a flat bottom especially because the product will be transferred from one belt to another across a depression or gap, thus inducing a vibration or oscillation.

While the referred to type of multiple process conveyor equipment is more reliable for weighing a product which is in a tray, since it will not wobble, there is an additional drawback. Since the entire movement of the product relies on friction with the conveyor surface, the consistency of that frictional contact controls the consistency of positioning of the label. If there is grease on the surface of either the conveyor or the product, or a difference in the weight of the product, thereby affecting the frictional drive, there could be a variation in the position of the product at the time the label is applied due to slippage. At the operating speeds common today of 70 or more pieces per minute, an individual product is on each station of the apparatus less than one second. A signal is generated prior to the time the product reaches the labelling station so that the label will be propelled to intercept the product at the right time. Unless the product moves forward at a known speed, the label may be applied differently from item to item. Naturally, the more uniform the label placement, the more acceptable the product. This situation is exacerbated by a design feature of many current conveyor weighing devices which, in order to separate items so only one is at the weighing station at a time, will run the three sections at successively increased speeds.

The problem described above is dealt with in applicant's U.S. Pat. No. 5,086,855 and the related divisional U.S. Pat. No. 5,137,099 the teachings of which are incorporated herein by reference. The '855 patent discloses an apparatus having a three-station conveyor, each station including a pair of vertically oriented product control belts. While the solution presented in the '855 patent avoids product wobble, it has been discovered that a vertical belt system mounted on the weighing station induces a degree of electromagnetic noise which distorts the weighing accuracy.

As used in the following description and claims, a "non-flat" bottom refers to a bottom surface of a product on which the product rests and which supports the product in a manner which is somewhat unstable and may tend to permit the product to wobble on a conveyor.

Therefore, an object of the present invention is to improve the accuracy and reliability of weighing of conveyor weighed products with non-flat bottoms.

A further object of the present invention is to improve the label placement accuracy of products labeled in a conveyorized operation.

An additional object of the present invention is to maintain better control of the products being weighed and labelled at current process speeds and further increased speeds likely to occur in the near future.

Other objects will become apparent as the description proceeds.

SUMMARY OF THE INVENTION

An apparatus is provided for the weighing and labelling of products with non-flat bottoms in a conveyorized, automated high-speed process in which there is a separate conveyor section associated with each function. An entry conveyor section and a labelling conveyor section each has a pair of adjustably spaced vertical control belts mounted perpendicular to the horizontal conveyor belt on which the product rests and is transported. The two vertically mounted pairs of control belts have resilient surfaces and are positioned and adjusted to grip the opposite sides of the non-flat bottom product so as to prevent oscillation and mispositioning due to high-speed handling, thus providing for accurate label placement. The middle weighing conveyor section has a pair of parallel, horizontal, flexible conveyor belts that rotate in close proximity to and over the top of a pair of low friction, highly slippery beveled blocks. A product placed on the flexible belts of the middle weighing conveyor section causes the belts to yield against beveled portions of the underlying blocks to form a longitudinal depression. The depression so formed cradles the product and prevents oscillation and mispositioning during transport through the middle section thereby providing more accurate weighing and subsequent accurate label placement.

BRIEF DESCRIPTION OF THE DRAWINGS

FIG. 2 is a top plan view of the invention apparatus including the conveyor belt system of FIG. 1 showing a bagged whole bird poultry product being conveyed therethrough.

FIG. 3 is a partial cross sectional elevational view taken in the direction of line 3—3 of FIG. 2.

FIG. 4 is a sectional elevational view taken in the direction of line 4—4 of FIG. 2 but with the whole bird product being transported eliminated for purpose of illustration.

FIG. 5 is the cross section view of FIG. 4 with a whole bird poultry product as seen from the foot end being transported thereon.

DESCRIPTION OF THE INVENTION

Figure 1:
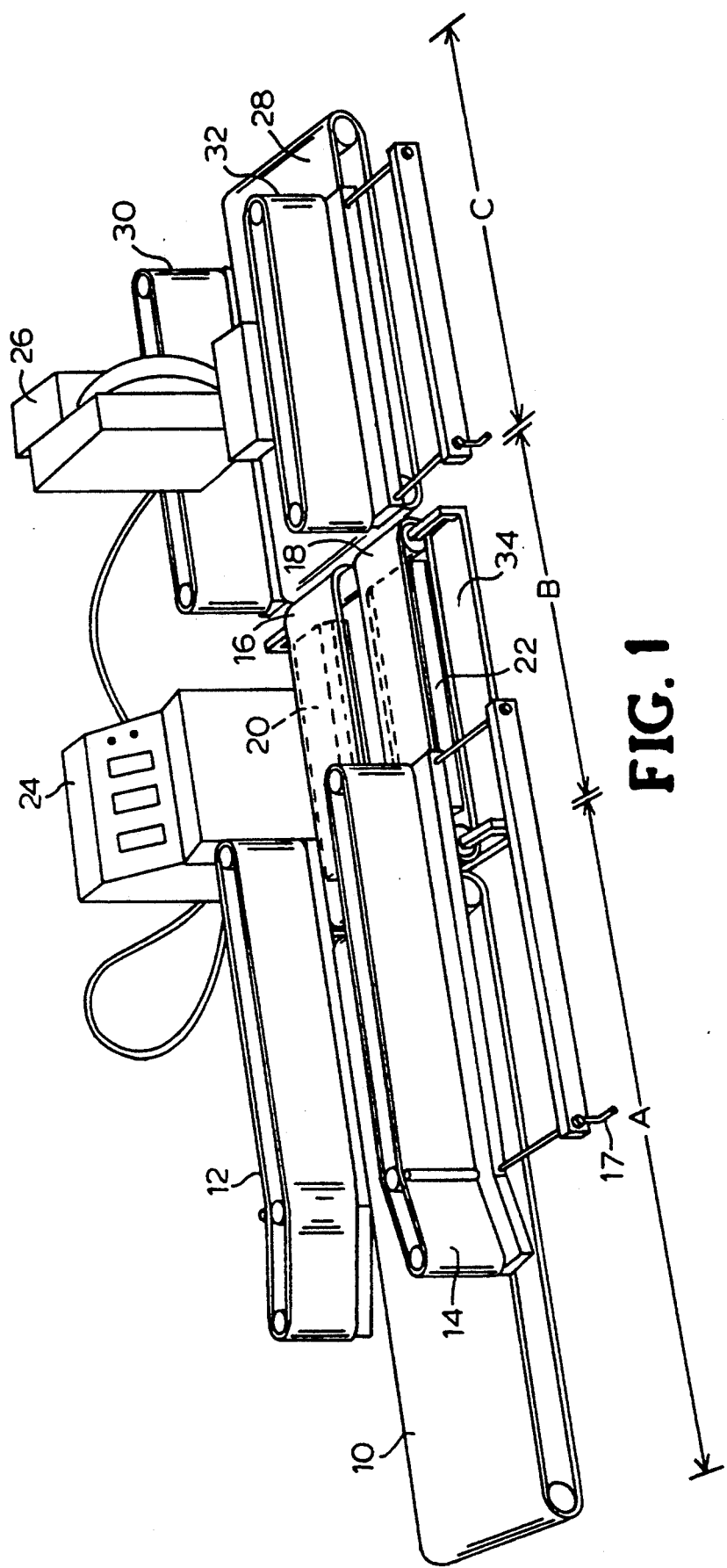
FIG. 1 is a perspective view of the weighing and labelling apparatus including the improved conveyor belt system of the invention, including an entry station, a weighing station and a labelling station.

An apparatus, according to the present invention, for the automatic, highspeed weighing and labelling of products having non-flat bottoms as shown in FIG. 1, has three operative stations designated A, B and C. A typical such product having a non-flat bottom is a bag-enclosed whole bird poultry product P. Station A is an entry section for transporting the product to the following stations for processing, Station B is a weighing operational station, and Section C is the operational station for printing and applying a label to the product. Throughout the operation and through all three stations, the product P being conveyed is continuously moving.

Station A functions to properly align product P on the conveyor system and to smoothly transfer product P to Station B as illustrated in FIG. 2. Station A has a substantially horizontal, flat, mechanically driven conveyor belt 10 extending from the entry end of the apparatus to the exit end of Station A. Mounted in a plane perpendicular to conveyor belt 10 in fixed relation thereto is rear control belt 12 (see FIG. 1), driven in the same direction and at the same speed as conveyor belt 10. Mounted parallel to rear control belt 12 and driven at the same speed and direction is front control belt 14, which is adjustable in its proximity to rear control belt 12 through a mechanism actuated by crank 17 and depicted in FIGS. 1 and 2 so as to accommodate various sizes of poultry.

The entry ends of vertical control belts 12 and 14 form an outwardly directed angle in relation to the main planes of belts 12 and 14 to allow the product P to be guided smoothly into the main conveyor path. Exit ends of vertical control belts 12 and 14 are configured to extend beyond the exit end of horizontal conveyor belt 10 and past the entry end of Station B, as depicted in FIGS. 1 and 2. FIG. 3 shows details of the conjunction between the horizontal belt 10 of Station A and the horizontal belt 18 of Station B in sectioned elevation view, indicating a gap G which would normally cause a passing conveyed product to drop slightly and impact against the second belts 16 and 18, thus generating a vibration. Vertical control belts 12 and 14, by extending beyond gap G, continue to laterally grip product P and prevent product P from dropping into gap G as product P advances past the physical break between the Station A horizontal conveyor belt 10 and the Station B horizontal conveyor belts 16 and 18. Thus, the continued support and control of product P by extended vertical control belts 12 and 14 minimizes product P oscillation at Station B where the critical weighing operation is performed. Any suitable drive mechanism may be employed to drive the belts of the invention apparatus, such mechanism not being shown to better illustrate the novel features of the invention.

FIG. 4 illustrates, in cross sectional view, the configuration of Section B but without the presence of the bagged whole bird product being transported. Blocks 20 and 22 are substantially rectangular in cross section with an upper surface beveled toward the respective inner edge of each block 20, 22 so as to form the contour of a longitudinal central depression between blocks 20 and 22. Belts 16 and 18 are made of a flexible and resilient material and are made sufficiently wide so as to be able to extend beyond the inner edges of blocks 20 and 22 toward the centerline of Station B and are appropriately tensioned to maintain a generally horizontal upper surface when not loaded with a product P.

As product P is carried by vertical control belts 12 and 14 beyond gap G and product P is released onto horizontal conveyor belts 16 and 18, the central edges of belts 16 and 18 yield beneath the weight of product P being transported thereon to rest upon the beveled edges of blocks 20 and 22 causing a longitudinal depression to form as shown in FIG. 5. The depression so formed functions to cradle product P and minimize oscillation as product P is weighed and transferred to Station C. Blocks 20, 22 are formed of a low friction material so as to minimize the sliding friction of belts 16 and 18 against blocks 20, 22, a preferred material being Delrin ® plastic resin (DuPont Company). An alternate embodiment recognized by the invention is to form the horizontal conveyor means of Station B as a single flexible belt which is capable of conforming to the contour of supporting blocks 20 and 22 when a product is being transported thereupon.

The entire Station B assembly, including horizontal belts 16 and 18 and supporting blocks 20 and 22, are supported from beneath by platform 34, as depicted in FIGS. 4 and 5 which platform 34 is supported upon one or more electronic scale load cells 36 or similarly functioning component. Load cells 36 are electrically connected to a scale device, which transmits weight data to a signal processor comprising a microprocessor or computer 24. Signal processor 24 by conventional means mathematically deducts the equipment tare weight and produces a net product weight which is then fed to the label printing and applying apparatus 26 at Station C of FIGS. 1 and 2.

Station C has a substantially horizontal, flat conveyor belt 28 and rear control belt 30 mounted perpendicular thereto in fixed relation. Front control belt 32 is mounted to be adjustably spaced from, and parallel to, rear control belt 30 in a similar manner to the mechanism of Station A. The three operative belts 28, 30, 32 of Station C run at the same speed and in the same direction but such speed is greater than that of belts 16 and 18 of Station B in order to maintain proper product spacing. Station C has a label printing apparatus 26 which receives weight information from the signal processing device 24 of Station B, and prints and applies a printed label to moving product P. A product sensing switch or photoelectric cell (not shown) may be placed along Station B to cue the label printer 26 in Station C to coordinate label application with product travel. Such a product sensing switch when employed can detect the product P as it passes a point upstream in the system and signal to a point downstream in the system such that according to the speed of the transport means product P will arrive at the downstream point at a given time.

In order to insure the positioning of only one product P at a time on weighing station B, the conveyor belts 16, 18 of weighing Station B run at a speed greater than that of entry Station A so as to convey a first product P through Station B before a second product P has emerged from Station A. Similarly, the belt 28 of the labelling Station C is run at a speed greater than that of Station B. A conventional drive mechanism, not shown, may be readily adapted. By this means, a spacing between successive items on each segment of the multiple segment conveyor, and particularly on weighing Station B is assured.

While the principal objective of the invention is the control of oscillation or wobble in a product having a non-flat bottom such as whole poultry, it should also be recognized that the invention apparatus and method lends itself to weighing and labelling meat and poultry products packaged in trays. The invention is particularly advantageous in this regard with respect to accurate placement of the labels and also in being able to alternate between accurately weighing and labelling products such as whole bird products and tray packaged products.

As will be appreciated by those skilled in the art, the specific details described in the illustrated embodiment of the present invention are not to be construed as limitations thereon. Other means to accomplish the objectives of the invention may be apparent and are considered within the scope and principles taught herein.

What is claimed is:

1. An apparatus for the weighing and labelling of a product with a non-flat bottom in a high-speed processing environment, comprising:
    (a) first conveyor means moving at a first selected speed, and having an entry end and an exit end and operative to align and stabilize a product with a non-flat bottom in a position suitable for being weighed while moving on a second conveyor means at a weighing station;
    (b) second conveyor means moving at a second selected speed equal to or higher than said first speed and having an entry end at which said aligned and stabilized product with a non-flat bottom is received from said exit end of said first conveyor means, said second conveyor means being deformable and adapted in response to the weight of said product and shape of said non-flat bottom to form a longitudinal depression in which said product is supported while being transported by said second conveyor means, said second conveyor means being operative to align and stabilize said product while being transported on said second conveyor means and to discharge said product at an exit end of said second conveyor means in a position suitable for being labelled while moving on a third conveyor means at a labelling station;
    (c) said second conveyor means being mounted on a weighing device capable of registering the weight of the product transported thereby to produce individual product weight information and transmit said product weight information as a signal to a signal processing device;
    (d) third conveyor means moving at a third speed equal to or higher than said second speed and having an entry end at which the aligned, stabilized and weighed product is received from the exit end of the second conveyor means, said third conveyor means being operative to align and stabilize each said product received from the exit end of said second conveyor means and to maintain each said product in a position suitable for being labelled while being moved continuously on said third conveyor means;
    (e) a signal processing device operatively associated with said weighing device and connected to receive said signal;
    (f) labelling means mounted adjacent said third conveyor means and connected to said signal processing device, said labelling means being adapted in response to said signal being received and processed by said signal processing device for imprinting and transferring a label onto each of said products in sequence prior to each of said products being expelled from the said weighing/labelling apparatus.

2. An apparatus for the weighing and labelling of a product as claimed in claim 1 wherein said second conveyor means comprises a pair of normally horizontally oriented coplanar belts providing a longitudinal space therebetween coinciding with the location of said longitudinal depression.

3. An apparatus for the weighing and labelling of a product as claimed in claim 2 wherein said second conveyor means includes support means shaped to permit the forming of said longitudinal depression and located to support the portion of said second conveyor means employed to support said product while being transported thereby.

4. An apparatus for the weighing and labelling of a product as claimed in claim 2 wherein said second conveyor means includes a pair of support members shaped to permit the forming of said longitudinal depression and located below the portion of said parallel belts used to support said product while being transported thereby.

5. An apparatus for the weighing and labelling of a product as claimed in claim 4 wherein said pair of support members each provide a low friction surface on which said portion of said horizontally oriented coplanar belts used to support said product are permitted to slide.

6. An apparatus for the weighing and labelling of a product as claimed in claim 1 wherein said second conveyor means includes support means shaped to permit the forming of said longitudinal depression and located to support the portion of said second conveyor means employed to support said product while being transported thereby.

7. An apparatus for the weighing and labelling of a product as claimed in claim 6 wherein said support means provides a low friction surface on which said portion of said second conveyor means employed to support said product is permitted to slide thereon.

8. An apparatus for the weighing and labelling of a product as claimed in claim 1 wherein said first conveyor means comprises a first horizontal conveyor aligned with said second conveyor means to support and transport said product and a pair of vertical control belts mounted in a pair of parallel planes perpendicular to said horizontal conveyor and operative in a direction parallel to the direction of said horizontal conveyor at a synchronous speed therewith, said vertical control belts being separated by a space such that said product with a non-flat bottom is gripped securely therebetween.

9. An apparatus for the weighing and labelling of a product as claimed in claim 8 in which said vertical control belts are adapted to be adjustable in spacing from one another while maintaining substantial parallelism.

10. An apparatus for the weighing and labelling of a product as claimed in claim 8 wherein said third conveyor means comprises a second horizontal conveyor aligned with said second conveyor means to support and transport said products during a labelling operation and a pair of vertical control belts mounted in a pair of parallel planes perpendicular to said second horizontal conveyor and operative in a direction parallel to the direction of said second horizontal conveyor at a synchronous speed therewith, said third conveyor means vertical control belts being separated by a space such that said product with a non-flat bottom is gripped securely therebetween.

11. An apparatus as claimed in claim 10 wherein the exit ends of said pair of vertical control belts extend beyond a break between said horizontal conveyor and said second conveyor means whereby to provide a smooth transition of said product to said second conveyor means.

12. An apparatus for the weighing and labelling of a product as claimed in claim 10 in which said first and third conveyor means vertical control belts are both adapted to be adjustable in spacing from one another while maintaining substantial parallelism.

13. An apparatus for the weighing and labelling of a product as claimed in claim 1 wherein said third conveyor means comprises a second horizontal conveyor aligned with said second conveyor means to support and transport said product during a labelling operation and a pair of vertical control belts mounted in a pair of parallel planes perpendicular to said second horizontal conveyor and operative in a direction parallel to the direction of said second horizontal conveyor at a synchronous speed therewith, said vertical control belts being separated by a space such that said product with a non-flat bottom is gripped securely therebetween.

14. An apparatus for the weighing and labelling of a product as claimed in claim 13 wherein said first conveyor means pair of vertical control belts are configured with greater separation at the entry end than at the exit end.

15. An apparatus as claimed in claim 13 wherein the exit ends of said first conveyor means pair of vertical control belts extend beyond a break between said horizontal conveyor and said second conveyor means whereby to provide a smooth transition of said product to said second conveyor means.

16. An apparatus for the weighing and labelling of a product as claimed in claim 13 in which said vertical control belts are adapted to be adjustable in spacing from one another while maintaining substantial parallelism.

17. A method for weighing and labelling a product having a non-flat bottom in a high speed processing environment, comprising:

(a) conveying said product on a first horizontal belt conveyor from an entry to an exit end;

(b) gripping said product while being conveyed on said first horizontal belt conveyor by means of a first pair of opposed vertical control belts extending between entry and exit ends and mounted adjacent to and driven synchronously with said first horizontal belt conveyor;

(c) releasing said product from and at the exit end of said first pair of vertical control belts at a point beyond the exit end of said first horizontal belt conveyor and onto a second horizontal belt conveyor supported by and associated with means for weighing said product;

(d) cradling said product in a longitudinal depression formed by said second horizontal belt conveyor as a portion of said second horizontal belt conveyor supporting said product slides over a pair of beveled support blocks to minimize product oscillation while being conveyed by said second horizontal belt conveyor;

(e) weighing said product while being conveyed on said second horizontal belt conveyor and deriving a net weight of the product by eliminating the tare weight of the second conveyor from the total weight registered;

(f) generating and transmitting a signal representative of the derived net weight of said product to a labelling apparatus located adjacent a third horizonal belt conveyor;

(g) gripping said product continuously while being conveyed by said third horizontal belt conveyor between a second pair of vertical control belts mounted perpendicular to and driven synchronously with said third horizontal belt conveyor to minimize product oscillation during labelling of said product;

(h) utilizing said signal, computing and printing said product net weight on a label and applying said label to said product by said labelling apparatus while said product is being continuously conveyed on said third belt conveyor; and (i) expelling said product from an exit end of said third belt conveyor.

18. The method as claimed in claim 17 in which said first pair of vertical control belts are configured with a greater separation at the entry end than at the exit end thereof and including the step of aligning said product to the path of said three conveyor means thereby.

19. The method as claimed in claim 18 in which the exit end of said first pair of vertical control belts extends beyond the exit end of said first horizontal belt conveyor and including the step of guiding said product smoothly over a break between said first horizontal belt conveyor and said second horizontal belt conveyor.

20. The method as claimed in claim 19 in which each of said pairs of vertical control belts are adapted to be adjustable in spacing of each said pair to adapt to different sizes of said product while maintaining substantial parallelism and including the step of adjusting such spacing to accommodate products of different size.

21. A weighing and labelling apparatus having conveyor belt system adapted to transport a series of products for weighing and labelling in a high-speed processing environment, comprising:

(a) first conveyor means having a first horizontal belt operative to transport a product from an entry end to an exit end thereof and a pair of spaced apart vertical control belts mounted thereabove and oriented to operate in a direction parallel to the direction of operation of said first horizontal belt;

(b) second conveyor means positioned horizontally adjacent the exit end of and aligned to operate in the same direction as said first horizontal conveyor belt and being adapted when not transporting a product to assume a substantially horizontal position and when transporting a product to form a longitudinal central depression conforming to the shape of the product being conveyed thereby;

(c) said pair of spaced apart control belts extending beyond the exit end of said first horizontal belt so as to prevent said products from oscillating in passing over a gap formed between said first and said second conveyor means; and (d) means for weighing said product while being conveyed by said second conveyor means preparatory to being labelled at a subsequent downstream location.

22. The weighing and labelling apparatus as claimed in claim 21 including means for mounting said vertical control belts in a manner enabling said control belts to be adjustable in spacing from each other to accommodate various size products.

23. A weighing and labelling apparatus as claimed in claim 21 wherein said pair of vertical control belts are configured with a greater separation at the said entry end than at the said exit end thereof.

24. The weighing and labelling apparatus as claimed in claim 23 further comprising:

(a) third conveyor means comprising a horizontal driven belt positioned adjacent the exit end of said second conveyor means; and (b) a second pair of spaced apart vertical control belts mounted above said third horizontal belt and driven in the same direction and at the same speed.

* * * * *

UNITED STATES PATENT AND TRADEMARK OFFICE
CERTIFICATE OF CORRECTION

PATENT NO. : 5,326,938
DATED : July 5, 1994
INVENTOR(S) : Sidney S. Tolson

It is certified that error appears in the above-indentified patent and that said Letters Patent is hereby corrected as shown below:

On the title page, item [54] and col. 1, line 1, in the title correct the word "WEIGHTING" to read --WEIGHING--.

Signed and Sealed this

Fourteenth Day of October, 1997

*Attest:*

BRUCE LEHMAN

*Attesting Officer*     *Commissioner of Patents and Trademarks*